US012723605B2

(12) United States Patent
Okano et al.

(10) Patent No.: US 12,723,605 B2
(45) Date of Patent: Sep. 1, 2026

(54) CONSTRUCTION MACHINE

(71) Applicant: Hitachi Construction Machinery Co., Ltd., Tokyo (JP)

(72) Inventors: Hajime Okano, Nagareyama (JP); Yuuji Murayama, Tsuchiura (JP); Yoshitaka Yanase, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 224 days.

(21) Appl. No.: 18/835,076

(22) PCT Filed: Mar. 27, 2023

(86) PCT No.: PCT/JP2023/012284
§ 371 (c)(1),
(2) Date: Aug. 1, 2024

(87) PCT Pub. No.: WO2023/190381
PCT Pub. Date: Oct. 5, 2023

(65) Prior Publication Data

US 2025/0137231 A1 May 1, 2025

(30) Foreign Application Priority Data

Mar. 29, 2022 (JP) ................................ 2022-053307

(51) Int. Cl.
*F15B 13/08* (2006.01)
*E02F 9/08* (2006.01)
(Continued)

(52) U.S. Cl.
CPC ........ *F15B 13/0814* (2013.01); *E02F 9/0875* (2013.01); *E02F 9/2242* (2013.01);
(Continued)

(58) Field of Classification Search
CPC .. F15B 11/17; F15B 13/0807; F15B 13/0814; F15B 13/0817; E02F 9/0875; E02F 9/2239; E02F 9/2242; E02F 9/2267
See application file for complete search history.

(56) References Cited

U.S. PATENT DOCUMENTS 5,056,415 A 10/1991 Karakama et al.
5,915,409 A * 6/1999 Kaneko ............... F15B 13/0832 137/884
(Continued)

FOREIGN PATENT DOCUMENTS

JP 1-220705 A 9/1989
JP 2003-97743 A 4/2003
(Continued)

OTHER PUBLICATIONS

International Search Report (PCT/ISA/210) issued in PCT Application No. PCT/JP2023/012284 dated May 9, 2023 with English translation (7 pages).
(Continued)

*Primary Examiner* — Michael Leslie
(74) *Attorney, Agent, or Firm* — Crowell & Moring LLP

(57) ABSTRACT

A plurality of control valves (39A to 39D, 40A to 40D, 41A to 41D, 42A to 42D, 43) is aligned and disposed in the right-and-left direction and in the vertical direction on a first mounting surface (38C) and a second mounting surface (38D). Further, a plurality of control valves (47, 48) is aligned and disposed in the right-and-left direction and in the vertical direction on a first mounting surface (46B) and a second mounting surface (46C).

5 Claims, 6 Drawing Sheets

(51) Int. Cl.
*E02F 9/22* (2006.01)
*F15B 11/17* (2006.01)

(52) U.S. Cl.
CPC .......... *E02F 9/2267* (2013.01); *E02F 9/2289* (2013.01); *E02F 9/2292* (2013.01); *F15B 11/17* (2013.01); *F15B 13/0807* (2013.01); *F15B 13/0825* (2013.01); *E02F 9/2296* (2013.01)

(56) References Cited

U.S. PATENT DOCUMENTS

| | | | | |
|---|---|---|---|---|
| 6,964,281 | B2 * | 11/2005 | Pieper | F15B 13/0814 137/596.13 |
| 8,499,795 | B2 * | 8/2013 | Tomoda | F15B 13/0817 137/884 |
| 9,494,171 | B2 * | 11/2016 | Kobayashi | F15B 13/024 |
| 9,651,159 | B2 * | 5/2017 | Choi | F16K 27/003 |
| 9,783,960 | B2 * | 10/2017 | Shimizu | E02F 9/2267 |
| 10,370,824 | B2 * | 8/2019 | Hiraku | E02F 9/2292 |
| 10,961,688 | B2 * | 3/2021 | Izumi | E02F 9/123 |
| 11,933,328 | B2 * | 3/2024 | Asahara | F15B 11/16 |
| 2011/0168930 | A1 | 7/2011 | Tomoda et al. | |
| 2015/0107712 | A1 | 4/2015 | Kobayashi et al. | |
| 2016/0032565 | A1 | 2/2016 | Shimizu et al. | |
| 2017/0073931 | A1 | 3/2017 | Hiraku et al. | |
| 2025/0019922 | A1 * | 1/2025 | Okano | E02F 9/02 |

FOREIGN PATENT DOCUMENTS

| | | | |
|---|---|---|---|
| JP | 2008-82161 | A | 4/2008 |
| JP | 2010-90652 | A | 4/2010 |
| JP | 2011-112077 | A | 6/2011 |
| JP | 2011-112123 | A | 6/2011 |
| JP | 2013-249896 | A | 12/2013 |
| JP | 2015-48899 | A | 3/2015 |
| JP | 2015-227544 | A | 12/2015 |
| JP | 2018-151036 | A | 9/2018 |
| JP | 2020-34022 | A | 3/2020 |
| WO | WO 2015/164321 | A1 | 10/2015 |

OTHER PUBLICATIONS

Japanese-language Written Opinion (PCT/ISA/237) issued in PCT Application No. PCT/JP2023/012284 dated May 9, 2023 with English translation (7 pages).

Japanese-language International Preliminary Report on Patentability (PCT/IPEA/416 & PCT/IPEA/409) issued in PCT Application No. PCT/JP2023/012284 dated May 17, 2024, including Annexes with partial English Translation (20 pages).

Extended European Search Report issued in European Application No. 23780390.3 dated Oct. 31, 2025 (10 pages).

* cited by examiner

CONSTRUCTION MACHINE

TECHNICAL FIELD

The present invention relates to a construction machine such as a hydraulic excavator, and more particularly, to a construction machine with a plurality of control valves controlling a hydraulic actuator.

BACKGROUND ART

A hydraulic excavator, serving as a representative type of construction machine, generally includes a self-propelled lower traveling structure, an upper revolving structure provided rotatably on the lower traveling structure via a revolving device and a working mechanism provided on a front side of the upper revolving structure. The hydraulic excavator is provided with hydraulic actuators such as a traveling hydraulic motor allowing the lower traveling structure to travel, a revolving hydraulic motor of the revolving device rotating the upper revolving structure, a boom cylinder, an arm cylinder and a bucket cylinder operating the working mechanism. Further, the upper revolving structure of the hydraulic excavator includes a revolving frame provided on a front side with the working mechanism, an engine as a prime mover provided on a rear side of the revolving frame, a hydraulic pump provided on the engine, and a control valve device located forward of the engine, provided on the revolving frame and controlling the hydraulic actuators.

In operation, the hydraulic excavator allows the engine to drive the hydraulic pump to supply hydraulic oil (pressurized oil) discharged from the hydraulic pump to the hydraulic actuators via the control valve device. This mechanism allows the hydraulic excavator to operate the lower traveling structure, the revolving device, and the working mechanism.

In recent years, even hydraulic excavators have been desired to reduce energy loss (flow rate loss, pressure loss) for energy conservation. Illustrative examples of a hydraulic system supplying hydraulic oil from a hydraulic pump to a hydraulic actuator include a closed circuit system connecting an exclusive closed-circuit hydraulic pump to the hydraulic actuator and supplying and discharging hydraulic oil between the hydraulic actuator and the exclusive closed-circuit hydraulic pump (Patent Document 1).

A hydraulic excavator of Patent Document 1 allows a closed circuit system to drive a revolving hydraulic motor of a revolving device and a boom cylinder, an arm cylinder, and a bucket cylinder of a working mechanism. The hydraulic excavator of Patent Document 1 also allows an open circuit system supplying hydraulic oil to a plurality of hydraulic actuators with a common hydraulic pump to drive left and right traveling hydraulic motors.

PRIOR ART DOCUMENT

Patent Document

Patent Document 1: Japanese Patent Laid-Open No. 2015-048899 A

SUMMARY OF THE INVENTION

The hydraulic excavator of Patent Document 1 includes numerous control valves for switching hydraulic oil (pressurized oil) supplying targets so as to supply hydraulic oil (pressurized oil) to a boom cylinder, an arm cylinder, a bucket cylinder, a revolving hydraulic motor and left and right traveling hydraulic motors from a plurality of closed-circuit hydraulic pumps and open-circuit hydraulic pumps appropriately. This configuration inevitably leads to larger manifolds to mount numerous control valves on a control valve device and a larger-sized entire system. Unfortunately, the use of such a control valve device, composed of numerous densely arranged control valves, fails to easily secure spaces for mounting control valves on manifolds, connecting pipes to the control valves and maintaining the control valve device, resulting in a lower operational efficiency for each operational work.

In view of the above-described problems of conventional technologies, an object of the present invention is to provide a construction machine capable of downsizing a control valve device and improving the operational efficiency for connecting pipes and maintaining the control valve device by securing a space on the periphery of the control valve device.

A construction machine according to the present invention includes: a vehicle body frame; a working mechanism provided on a front side of the vehicle body frame and including a plurality of hydraulic actuators; a prime mover provided on a rear side of the vehicle body frame; a hydraulic pump provided on the prime mover; and a control valve device located forward of the prime mover, provided on the vehicle body frame and controlling the plurality of hydraulic actuators, characterized in that the control valve device comprises: a manifold mounted on the vehicle body frame, composed of a block having two opposed surfaces defined as a first mounting surface and a second mounting surface, and including an oil passage formed therein; and a plurality of control valves mounted on the first mounting surface and the second mounting surface, respectively, and supplying and discharging hydraulic oil supplied from the hydraulic pump via the oil passage of the manifold to the plurality of hydraulic actuators, characterized in that a number of control valves of the plurality of control valves controlling one hydraulic actuator of the plurality of hydraulic actuators are aligned and disposed in a predetermined direction on the first mounting surface or the second mounting surface.

According to the present invention, a control valve device can be downsized and the operational efficiency for connecting pipes and maintaining the control valve device can be improved by securing a space on the periphery of the control valve device.

MODE FOR CARRYING OUT THE INVENTION

A representative type of construction machine according to an embodiment of the present invention, by taking the case of a hydraulic excavator, will be explained in detail with reference to FIGS. 1 to 8.

Figure 1:
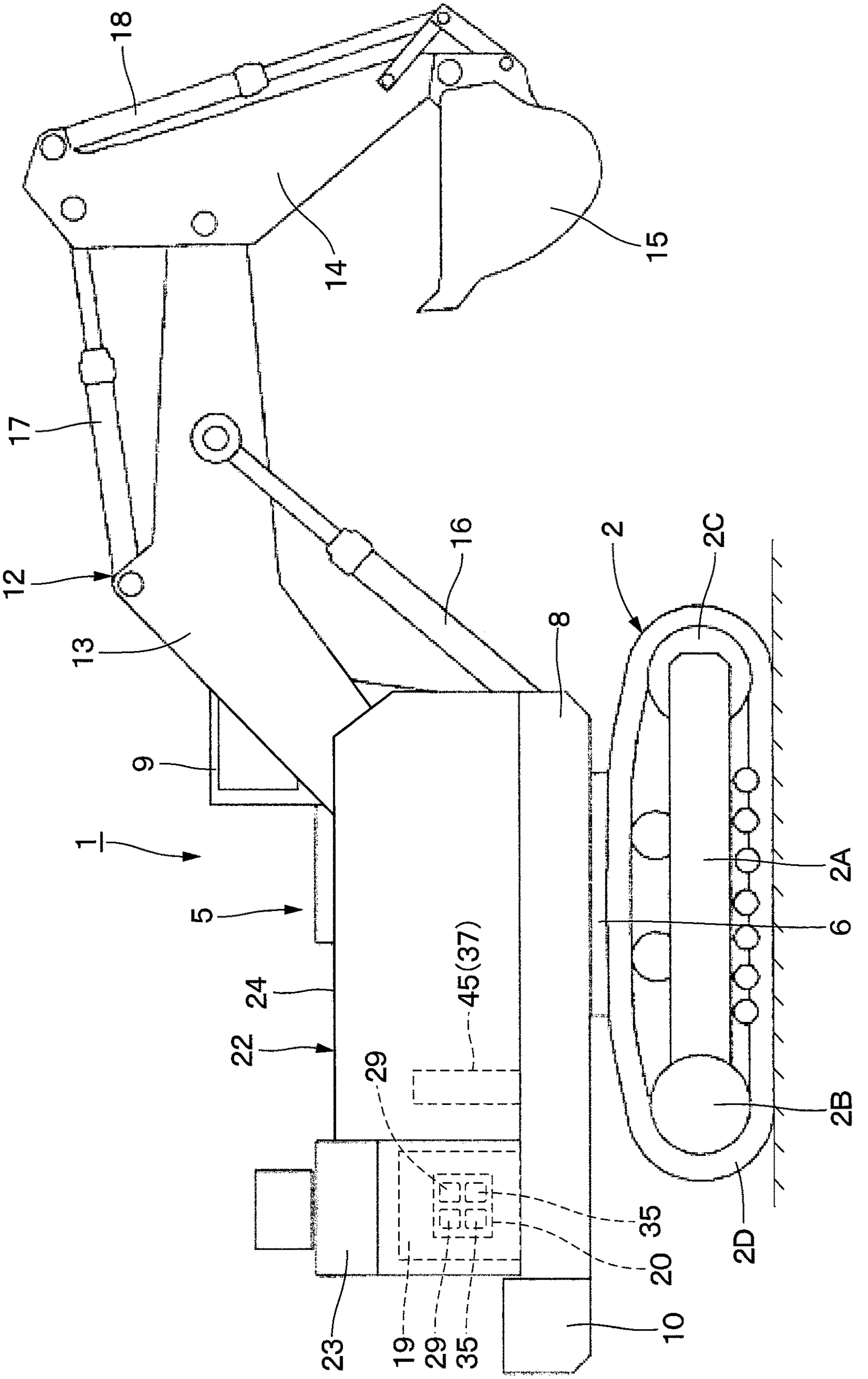
FIG. 1 is a right side view showing a hydraulic excavator according to an embodiment of the present invention.

In FIG. 1, a hydraulic excavator 1 serving as a representative type of construction machine is used to perform excavating work of sand and earth. The hydraulic excavator 1 includes a crawler-type self-propelled lower traveling structure 2, an upper revolving structure 5 provided rotatably on the lower traveling structure 2 and constituting a vehicle body together with the lower traveling structure 2, and a working mechanism 12 provided on a front side of the upper revolving structure 5. The hydraulic excavator 1 performs excavating work of sand and earth, using the working mechanism 12.

The lower traveling structure 2 includes a truck frame 2A, a drive wheel 2B provided on either right or left side of the truck frame 2A, an idler wheel 2C provided on either right or left side of the truck frame 2A and opposite the drive wheel 2B in the front-rear direction, and a crawler belt 2D looped around the drive wheel 2B and the idler wheel 2C (each shown only on the right side). The left drive wheel is rotatively driven by a left traveling hydraulic motor 3 (see FIG. 8). The right drive wheel 2B is rotatively driven by a right traveling hydraulic motor 4 (see FIG. 8). The traveling hydraulic motors 3, 4 constitute a hydraulic actuator.

The upper revolving structure 5 is mounted rotatably on the lower traveling structure 2 through a revolving device 6 (see FIG. 1). The revolving device 6 is configured to include a revolving hydraulic motor 7 (see FIG. 8) as a hydraulic actuator, a reduction mechanism, and a revolving bearing (each not shown). The revolving device 6 (revolving hydraulic motor 7) drives/revolves the upper revolving structure 5 with respect to the lower traveling structure 2.

Figure 2:
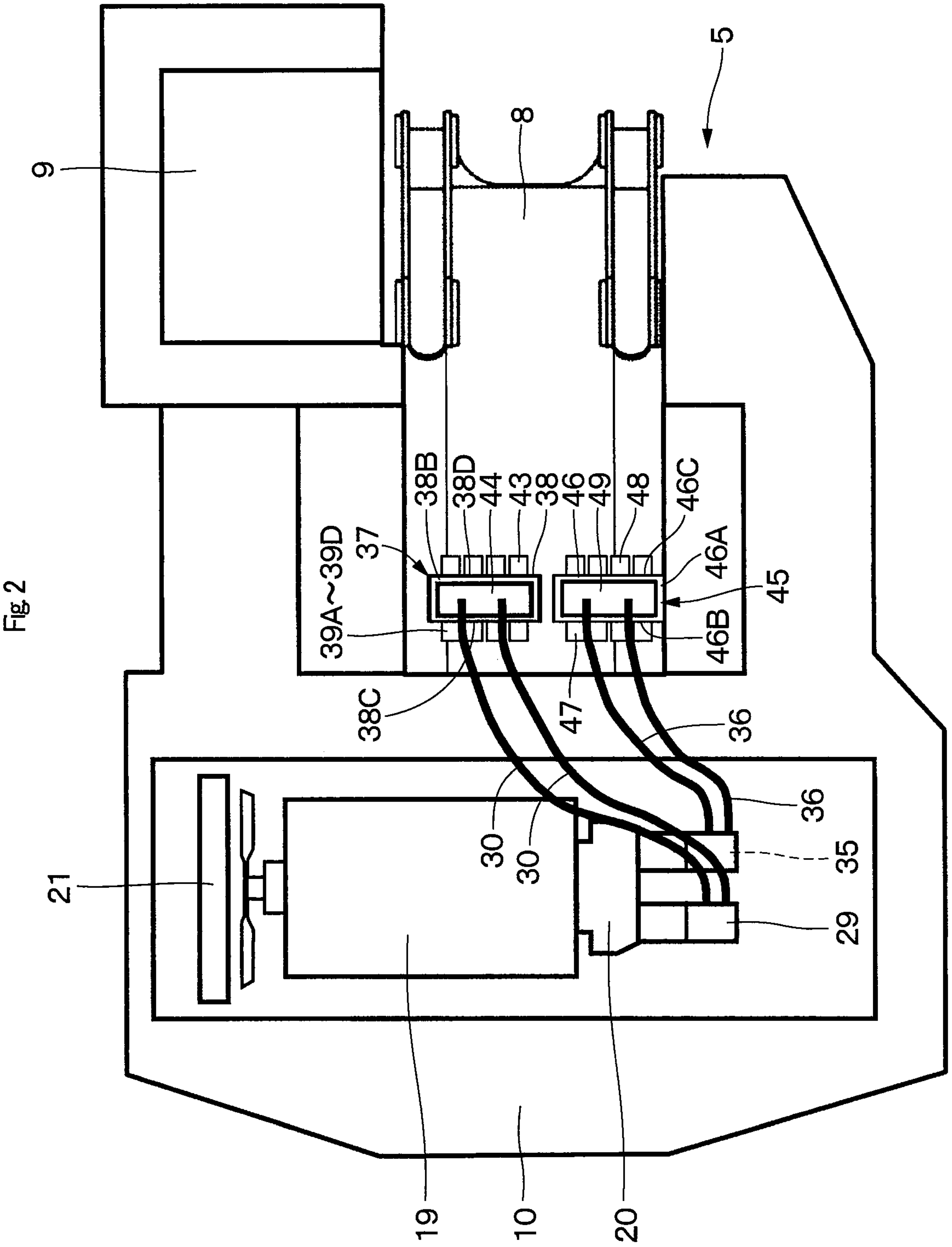
FIG. 2 is a plan view of an upper revolving structure without a housing.
Figure 3:
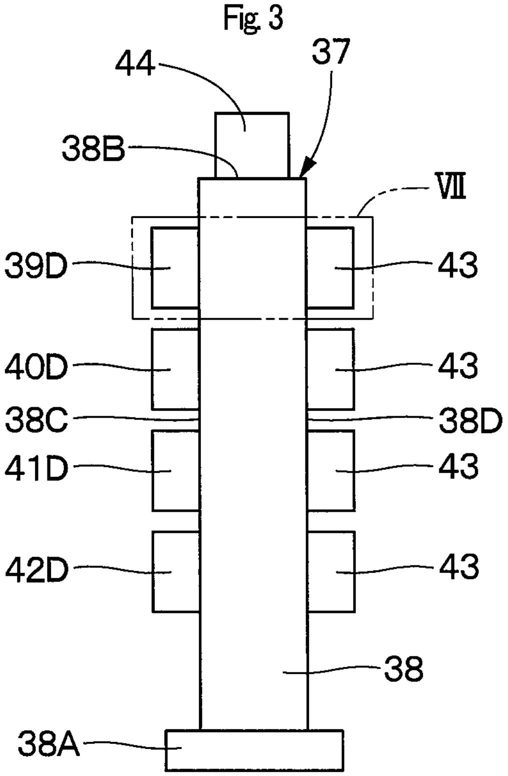
FIG. 3 is a right side view of a control valve device.
Figure 4:
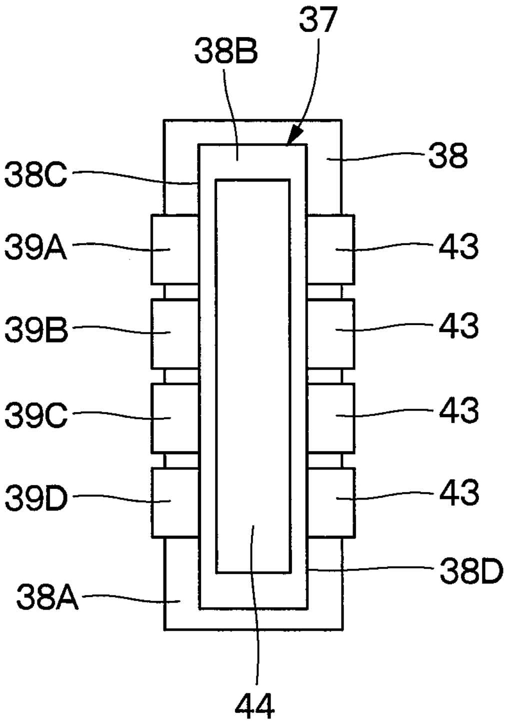
FIG. 4 is a plan view of the control valve device.

As shown in FIGS. 1 and 2, the upper revolving structure 5 includes a revolving frame 8 as a vehicle body frame constituting a support structure and provided with a working mechanism 12 mounted on a front side thereof, a cab 9 mounted on a left front side of the revolving frame 8 and forming an operator's room therein, a later-described engine 19 located on a rear side of the cab 9 and mounted on the revolving frame 8, a housing 22 accommodating a closed-circuit hydraulic pump 29, an open-circuit hydraulic pump 35 and the like, and a counterweight 10 mounted at a rear portion of the revolving frame 8 and taking a weight balance with the working mechanism 12.

Herein, an operator's seat for an on-board operator to be seated (not shown) is provided inside the cab 9. An operating device 11 operating the hydraulic excavator 1 (see FIG. 8) is provided in front and on the left and right sides of the operator's seat. The operating device 11 is illustrated as one example of a target to be operated and a lever operation combined, and configured to include a left control lever 11A for operating the revolving hydraulic motors 7 and a later-described arm cylinder 17, a right control lever 11B for operating a later-described boom cylinder 16 and a bucket cylinder 18, and left and right traveling levers 11C, 11D operating the left traveling hydraulic motor 3 and the right traveling hydraulic motor 4, respectively.

The operating device 11 is connected to a later-described controller 51 via signal lines and the like. An operator can operate the operating device 11 to revolve the upper revolving structure 5, rotate the working mechanism 12 and allow the lower traveling structure 2 to travel. For example, the operator can operate the left control lever 11A to expand and contract an arm cylinder 17 and rotate a later-described arm 14. Also, the operator can operate the right control lever 11B to expand and contract a boom cylinder 16 and rotate a later-described boom 13.

As shown in FIG. 1, the working mechanism 12 includes a boom 13 mounted rotatably on a front side of the revolving frame 8, an arm 14 mounted rotatably on a tip end side of the boom 13, and a bucket 15 mounted rotatably on a tip end side of the arm 14. The boom 13, the arm 14, and the bucket 15 are driven by the boom cylinder 16, the arm cylinder 17, and a bucket cylinder 18, respectively, each composed of a hydraulic cylinder. The boom cylinder 16 allows the boom 13 to rotate with respect to the revolving frame 8, the arm cylinder 17 allows the arm 14 to rotate with respect to the boom 13, and the bucket cylinder 18 allows the bucket 15 to rotate with respect to the arm 14.

The boom cylinder 16, the arm cylinder 17, and the bucket cylinder 18, each as a hydraulic actuator, expand or contract based upon hydraulic oil (pressurized oil) from a later-described closed-circuit hydraulic pump 29 and an open-circuit hydraulic pump 35 to change the posture of the working mechanism 12. That is, the boom cylinder 16, the arm cylinder 17, and the bucket cylinder 18 expand or contract based upon the operation of the left control lever 11A and the right control lever 11B, for example, to rotate the boom 13, the arm 14, and the bucket 15, when the vehicle excavates earth and sand. The resulting operation of the bucket 15 can excavate earth and sand.

Herein, the boom cylinder 16, the arm cylinder 17, and the bucket cylinder 18 are configured as a single rod-type hydraulic cylinder to expand or contract based upon the supply and discharge of hydraulic oil. That is, the boom cylinder 16, the arm cylinder 17, and the bucket cylinder 18 are configured by a tube, a piston slidably inserted into the tube and defining the inside of the tube for a bottom side oil chamber and a rod side oil chamber, and a rod whose base end side is mounted on the piston and whose tip end side projects out of the tube.

As shown in FIG. 2, an engine 19, as a prime mover, is located on a front side of the counterweight 10 and provided on the revolving frame 8. The engine 19 is configured as a diesel engine, for example. One engine 19 is transversely provided to extend in the right-and-left direction on a rear side of the revolving frame 8. For example, a plurality of closed-circuit hydraulic pumps 29, a plurality of open-circuit hydraulic pumps 35 and others are mounted on the right side of the engine 19 via a power transmission device 20. The power transmission device 20 has a plurality of gear mechanisms transmitting a rotation of an output shaft of the engine 19 and the respective gear mechanisms are connected to the plurality of closed-circuit hydraulic pumps 29, the plurality of open-circuit hydraulic pumps 35 and others. A heat exchanger 21 composed of a radiator, an oil cooler, a condenser and other elements is disposed on the left side of the engine 19.

The prime mover may be a single electric motor, or a hybrid type prime mover composed of a diesel engine and an electric motor combined. Meanwhile, the prime mover may be configured to be longitudinally provided to extend in the front-rear direction of the upper revolving structure 5. In addition, such two prime movers may be disposed side by side in the right-and-left direction.

The housing 22 is provided on the revolving frame 8 so as to cover apparatuses including the engine 19, the closed-circuit hydraulic pumps 29, the open-circuit hydraulic pumps 35 and the heat exchanger 21. The housing 22 is configured to include a left side plate (not shown), a right side plate 23 and an upper surface plate 24. The housing 22 is formed, for example, by mounting iron plates and other materials on frameworks composed of a plurality of steel materials.

Next, the configuration of closed circuit systems 25 to 28 and open circuit systems 31 to 34 will be described.

In this embodiment, a hydraulic system of the hydraulic excavator 1 is configured to allow a later-described closed-circuit control valve device 37 to connect any one closed-circuit hydraulic pump 29 to any one hydraulic actuator in the form of a closed circuit (to configure a closed circuit) between four closed-circuit hydraulic pumps 29, and four hydraulic actuators: the boom cylinder 16, the arm cylinder 17, the bucket cylinder 18 and the revolving hydraulic motor 7. Then, the controller 51 controls the closed-circuit control valve device 37, depending on the situations of operations and work, to control the switching between each of the hydraulic actuators and each of the closed-circuit hydraulic pumps 29.

In this example, the case where each of the closed-circuit hydraulic pumps 29 is connected to each of the hydraulic actuators to configure four closed circuit systems will be described. Specifically, the closed circuit system 25 is a hydraulic system for driving the boom cylinder 16. The closed circuit system 26 is a hydraulic system for driving the arm cylinder 17. The closed circuit system 27 is a hydraulic system for driving the bucket cylinder 18. Further, the closed circuit system 28 is a hydraulic system for driving the revolving hydraulic motor 7. The configuration of these four most simplified closed circuit systems 25 to 28 will be described.

The closed circuit system 25 includes the closed-circuit hydraulic pumps 29 driven by the engine 19 and a plurality of closed-circuit pipes 30 connecting the closed-circuit hydraulic pump 29 and the boom cylinder 16. In addition, the closed circuit system 25 is provided with later-described control valves 39A to 39D of the closed-circuit control valve device 37 (see FIG. 8) in the course of the plurality of closed-circuit pipes 30.

Herein, the configuration of the closed circuit systems 26 to 28 is generally the same as that of the closed circuit system 25. Thus, in the closed circuit systems 26 to 28, the component elements that are identical to those of the closed circuit system 25 will be denoted by the same reference numerals to avoid repetitions of similar explanations.

As shown in FIG. 2, a plurality of, for example, four closed-circuit hydraulic pumps 29 that constitute the closed circuit systems 25 to 28 are mounted on the right side of the engine 19 (the power transmission device 20). The four closed-circuit hydraulic pumps 29 are configured by a swash plate type hydraulic pump, an inclined shaft type hydraulic pump or a radial piston type hydraulic pump, for example.

The closed-circuit pipes 30 of the closed circuit system 25 connect the closed-circuit hydraulic pump 29 for the boom cylinder 16 and the boom cylinder 16 (bottom side oil chamber, rod side oil chamber). In addition, a later-described closed-circuit control valve device 37 is provided in the course of the closed-circuit pipes 30 of the closed circuit system 25.

Closed-circuit pipes 30 of the closed circuit system 26 connect the closed-circuit hydraulic pump 29 for the arm cylinder 17 and the arm cylinder 17. In addition, the closed-circuit control valve device 37 is provided in the course of the closed-circuit pipes 30 of the closed circuit system 26.

Closed-circuit pipes 30 of the closed circuit system 27 connect the closed-circuit hydraulic pump 29 for the bucket cylinder 18 and the bucket cylinder 18. In addition, the closed-circuit control valve device 37 is provided in the course of the closed-circuit pipes 30 of the closed circuit system 27.

Further, closed-circuit pipes 30 of the closed circuit system 28 connect the closed-circuit hydraulic pump 29 for the revolving hydraulic motor 7 and the revolving hydraulic motor 7. In addition, the closed-circuit control valve device 37 is provided in the course of the closed-circuit pipes 30 of the closed circuit system 28.

As described above, in this embodiment, it is possible to optionally switch the connection of any closed-circuit hydraulic pump 29 to any hydraulic actuator. Therefore, any closed-circuit hydraulic pump 29 and a pump side pipe 30A connected to the closed-circuit hydraulic pump 29 can selectively be connected to various hydraulic actuators, depending on the state of the closed-circuit control valve device 37.

Next, the open circuit system 31 is a hydraulic system for compensating for hydraulic oil relative to the closed circuit system 25. An open circuit system 32 is a hydraulic system for compensating for hydraulic oil relative to the closed circuit system 26. An open circuit system 33 is a hydraulic system for compensating for hydraulic oil relative to the closed circuit system 27. Further, an open circuit system 34 is a hydraulic system for compensating for hydraulic oil relative to the closed circuit system 28. In addition, the open circuit systems 31 to 34 supply pressurized oil to the left and right traveling hydraulic motors 3, 4 as well.

The open circuit system 31 includes an open-circuit hydraulic pump 35 driven by the engine 19 and open-circuit pipes 36 connecting the open-circuit hydraulic pump 35 and the closed-circuit pipes 30 of the closed circuit system 25. In addition, the open circuit system 31 is provided with a control valve 47 of a later-described open-circuit control valve device 45 in the course of the open-circuit pipes 36.

Herein, the configuration of the open circuit systems 32 to 34 is generally the same as that of the open circuit system 31. Thus, in the open circuit systems 32 to 34, the component elements that are identical to those of the open circuit system 31 will be denoted by the same reference numerals to avoid repetitions of similar explanations.

As shown in FIG. 2, a plurality of, for example, four open-circuit hydraulic pumps 35 that constitute the open circuit systems 31 to 34 are mounted on the right side of the engine 19 (the power transmission device 20). The four open-circuit hydraulic pumps 35 are configured by a swash plate type hydraulic pump, an inclined shaft type hydraulic pump or a radial piston type hydraulic pump, for example.

Open-circuit pipes 36 of the open circuit system 32 connect the open-circuit hydraulic pump 35 of the open circuit system 32 and the closed-circuit pipes 30 of the closed circuit system 26. In addition, an open-circuit control valve device 45 is provided in the course of the open-circuit pipes 36 of the open circuit system 32.

Open-circuit pipes 36 of the open circuit system 33 connect the open-circuit hydraulic pump 35 of the open circuit system 33 and the closed-circuit pipes 30 of the closed circuit system 27. In addition, the open-circuit control valve device 45 is provided in the course of the open-circuit pipes 36 of the open circuit system 33.

Further, open-circuit pipes 36 of the open circuit system 34 connect the open-circuit hydraulic pump 35 of the open circuit system 34 and the closed-circuit pipes 30 of the closed circuit system 28. In addition, the open-circuit control valve device 45 is provided in the course of the open-circuit pipes 36 of the open circuit system 34.

Subsequently, the configuration of the closed-circuit control valve device 37 and the open-circuit control valve device 45 that constitute the characterizing portion of an embodiment of the present invention will be described. As shown in FIG. 2, in this embodiment, with the closed-circuit control valve device 37 and the open-circuit control valve device 45 installed in a transversely mounted state extending in the right-and-left direction, later-described manifolds 38, 46 have each a front surface and a rear surface provided as mounting surfaces for control valves 39A to 39D, 40A to 40D, 41A to 41D, 42A to 42D, 43, 47, 48. Conversely, with the control valve devices installed in a longitudinally mounted state extending in the front-rear direction, each manifold has a left surface and right surface provided as mounting surfaces for the control valves.

The closed-circuit control valve device 37 is located forward of the engine 19 and provided on the revolving frame 8. The closed-circuit control valve device 37 is transversely installed leftward of the revolving frame 8 to extend in the right-and-left direction. The closed-circuit control valve device 37 includes a later-described manifold 38, control valves 39A to 39D, 40A to 40D, 41A to 41D, 42A to 42D, other control valves 43, and a filter 44.

The manifold 38 constitutes a base of the closed-circuit control valve device 37 and is mounted on the revolving frame 8. The manifold 38 is a structure on which the above-mentioned plurality of control valves is mounted, connected by a hydraulic pump and an actuator pipe, and including an oil passage formed therein to guide pressurized oil supplied from the hydraulic pump to a plurality of control valves and output the pressurized oil controlled by the plurality of control valves to each actuator. In addition, the manifold 38 is flat in the front-rear direction and formed as a rectangular block (structure in the form of a block) extending in the right-and-left direction and in the vertical direction. Accordingly, the width direction of the manifold 38 corresponds to the right-and-left direction. The manifold 38 has a lower portion 38A detachably mounted on the revolving frame 8 with bolts (not shown). The filter 44 is mounted on an upper surface 38B of the manifold 38.

Herein, the manifold 38 has two surfaces that are opposed in the front-rear direction, that is, a front surface and a rear surface, the rear surface being defined as a first mounting surface 38C. As shown in FIGS. 3 to 6, the closed-circuit control valves 39A to 39D, 40A to 40D, 41A to 41D, 42A to 42D are mounted on the first mounting surface 38C. Also, a connection opening (not shown) for allowing hydraulic oil to circulate between the control valves 39A to 39D, 40A to 40D, 41A to 41D, 42A to 42D is provided on the first mounting surface 38C. There are any number of connection openings, for example, sixteen connection openings, each provided for each of the control valves 39A to 39D, 40A to 40D, 41A to 41D, 42A to 42D.

Figure 5:
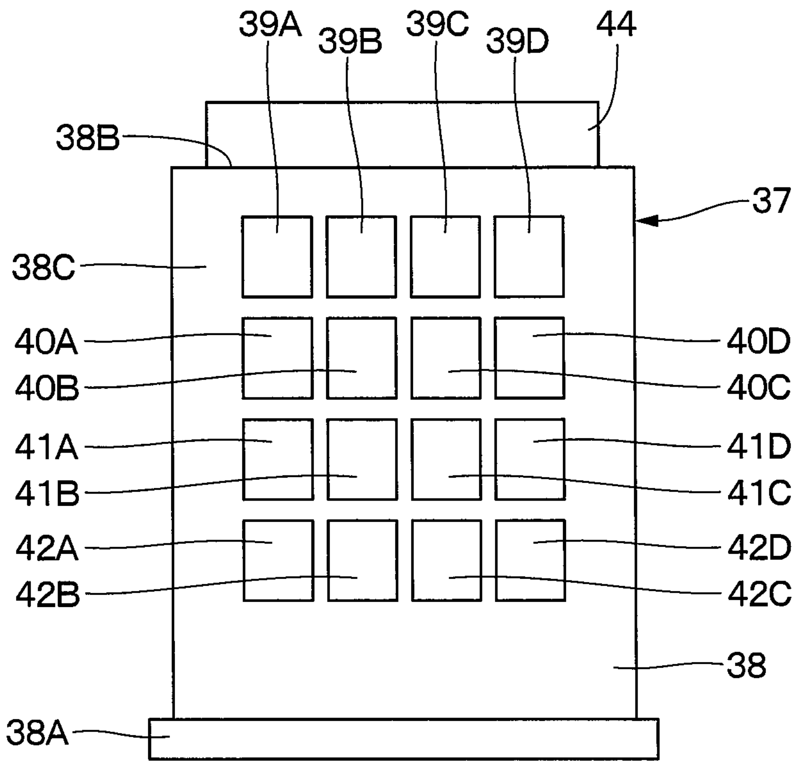
FIG. 5 is a rear view of the control valve device.

The sixteen connection openings are aligned and disposed in a 4 by 4 matrix at equal intervals in the right-and-left direction and in the vertical direction. As shown in FIG. 5, for example, the control valves 39A to 39D, each controlling the boom cylinder 16, are connected to four connection openings in the upper-most row (first row) from left to right. The control valves 40A to 40D, each controlling the arm cylinder 17, are connected to four connection openings in the second row from left to right. The control valves 41A to 41D, each controlling the bucket cylinder 18, are connected to four connection openings in the third row from left to right. Further, the control valves 42A to 42D, each controlling the revolving hydraulic motor 7, are connected to four connection openings in the lower-most row (fourth row) from left to right.

Meanwhile, the front surface of the manifold 38 is defined as a second mounting surface 38D which is the other of the front-rear surfaces facing each other in the front-rear direction. The second mounting surface 38D serves as mounting surfaces for, for example, sixteen other control valves 43, which are different from the closed-circuit control valves 39A to 39D, 40A to 40D, 41A to 41D, 42A to 42D. As with the first mounting surface 38C, other connection openings (not shown) for allowing hydraulic oil to circulate between the sixteen other control valves 43 are provided on the second mounting surface 38D. There are sixteen additional connection openings provided for the other control valves 43.

Figure 6:
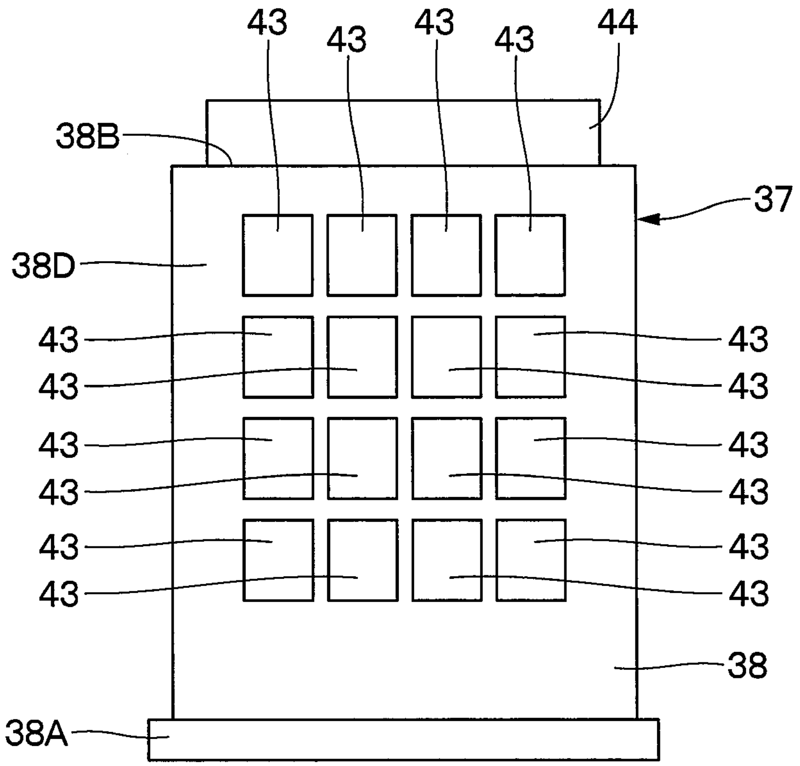
FIG. 6 is a front view of the control valve device.

The sixteen other connection openings are aligned and disposed in a 4 by 4 matrix at equal intervals in the right-and-left direction and in the vertical direction. As shown in FIG. 6, for example, a plurality of other control valves 43 is connected to the sixteen other connection openings in appropriately consideration of associated operations.

Moreover, the manifold 38 includes a plurality of oil passage (each not shown) therein communicating other connection openings and communicating the other connection openings and the upper surface 38B (filter 44) appropriately. The plurality of oil passages can be formed by casting a manifold. Nowadays, however, oil passages are formed by drilling a block and subsequently blocking the resulting opening as required.

The control valves 39A to 39D, 40A to 40D, 41A to 41D, 42A to 42D are closed-circuit control valves mounted on the first mounting surface 38C. The control valves 39A to 39D, 40A to 40D, 41A to 41D, 42A to 42D supply and discharge hydraulic oil supplied from the closed-circuit hydraulic pump 29 to a plurality of hydraulic actuators via the oil passages of the manifold 38. The control valves 39A to 39D, 40A to 40D, 41A to 41D, 42A to 42D are mounted on the first mounting surface 38C with bolts or others so as to communicate with the connection openings formed on the first mounting surface 38C. The control valves 39A to 39D, 40A to 40D, 41A to 41D, 42A to 42D are aligned and disposed in a predetermined direction on an inner surface of the first mounting surface 38C of the manifold 38, that is, in the right-and-left direction as the width direction and in the vertical direction.

Specifically, as shown in FIG. 5, the control valves 39A to 39D, 40A to 40D, 41A to 41D, 42A to 42D are aligned in a 4 by 4 matrix at equal intervals in the right-and-left direction and in the vertical direction. For example, the control valves 39A to 39D, each controlling the boom cylinder 16, are arranged in the upper-most row (first row) from left to right in the width direction of the manifold 38 (the right-and-left direction). The control valves 40A to 40D, each controlling the arm cylinder 17, are arranged in the second row from left to right in the width direction of the manifold 38. The control valves 41A to 41D, each controlling the bucket cylinder 18, are arranged in the third row from left to right in the width direction of the manifold 38. Further, the control valves 42A to 42D, each controlling the revolving hydraulic motor 7, are arranged in the lower-most row (fourth row) from left to right in the width direction of the manifold 38.

Accordingly, the control valves of the sixteen control valves 39A to 39D, 40A to 40D, 41A to 41D, 42A to 42D located in the first column from left (leftmost column) and arranged in the vertical direction of the manifold 38, that is, the control valves 39A, 40A, 41A, 42A are provided for the closed-circuit hydraulic pump 29 of the identical closed circuit system 25. The control valves 39B, 40B, 41B, 42B located in the second column from left and arranged in the vertical direction are provided for the closed-circuit hydraulic pump 29 of the identical closed circuit system 26. The control valves 39C, 40C, 41C, 42C located in the third column from left and arranged in the vertical direction are provided for the closed-circuit hydraulic pump 29 of the identical closed circuit system 27. Further, the control valves 39D, 40D, 41D, 42D located in the fourth column from left (rightmost column) and arranged in the vertical direction are provided for the closed-circuit hydraulic pump 29 of the identical closed circuit system 28.

The other control valves 43 are closed-circuit control valves mounted on the second mounting surface 38D, in addition to the control valve 39A to 39D, 40A to 40D, 41A to 41D, 42A to 42D. The other control valves 43 are mounted on the second mounting surface 38D with bolts or others so as to communicate with the other connection openings formed on the second mounting surface 38D. The other control valve 43 are aligned and disposed in the form of a matrix in the right-and-left direction as the width direction of the manifold 38 and in the vertical direction. Specifically, as shown in FIG. 6, the other sixteen control valves 43 are aligned in a 4 by 4 matrix at equal intervals in the right-and-left direction and in the vertical direction.

Figure 7:
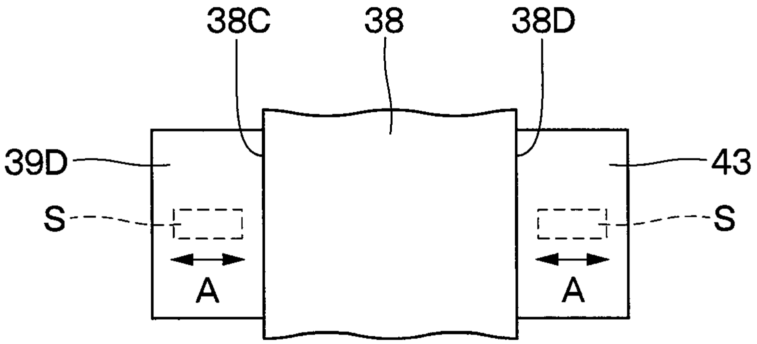
FIG. 7 is an enlarged view of a VII portion in FIG. 3.
Figure 8:
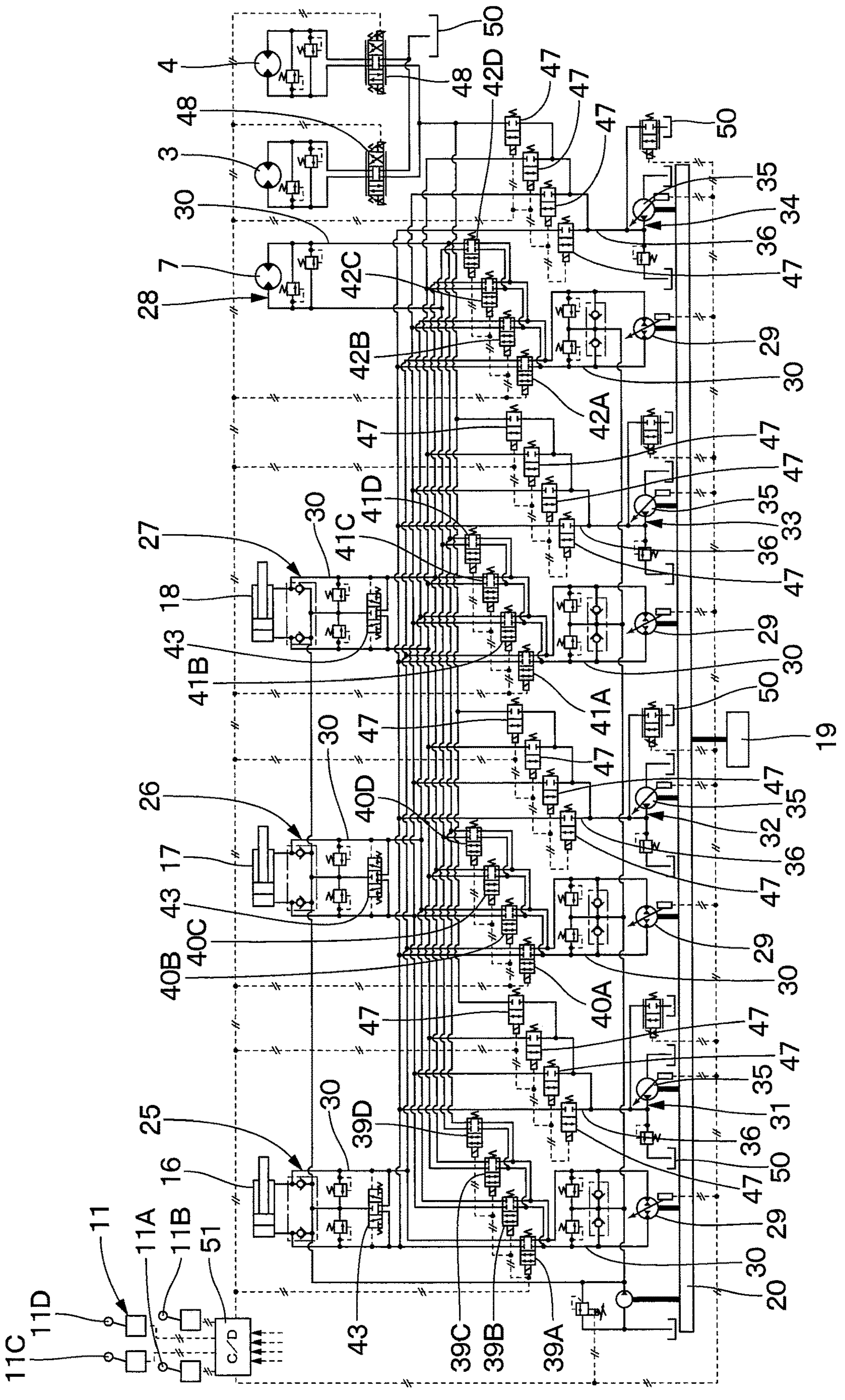
FIG. 8 is a hydraulic circuit diagram of the hydraulic excavator.

Herein, the control valves 39A to 39D, 40A to 40D, 41A to 41D, 42A to 42D, 43 are configured, for example, as electromagnetic switching valves each having a spool movable in the axial direction. As shown in FIG. 7, a representative control valve 39D and other control valve 43 each have a spool S movable in the axial direction (linearly). The control valve 39D mounted on the first mounting surface 38C of the manifold 38 and the other control valve 43 mounted on the second mounting surface 38D are disposed so as to allow the spool S to operatively approach or separate from the manifold 38 in a direction, that is, in the direction of arrow A in FIG. 7. In other words, the control valve 39D is disposed such that the spool S moves perpendicularly to the first mounting surface 38C. In addition, the other control valve 43 is disposed such that the spool S moves perpendicularly to the second mounting surface 38D. The control valves 39A to 39C, 40A to 40D, 41A to 41D, 42A to 42D, and the other control valve 43 are configured, as in the above-mentioned control valves 39D, 43.

In this embodiment, sixteen connection openings are aligned and disposed on the first mounting surface 38C and the second mounting surface 38D, respectively, in a 4 by 4 matrix at equal intervals in the right-and-left direction and in the vertical direction. Accordingly, an oil passage communicating the control valves 39A, 40A, 41A, 42A can readily be formed only by drilling the manifold 38 downward from the upper surface 38B thereof. In addition, an oil passage communicating the control valves 39A to 39D can readily be formed only by drilling the manifold 38 in the right-and-left direction. Likewise, oil passages communicating the control valves 40A to 40D, 41A to 41D, 42A to 42D, and the other control valves 43 can readily be formed.

The filter 44 is mounted on the upper surface 38B of the manifold 38. The filter 44 can prevent damage on a sliding portion of a hydraulic actuator or a valve by capturing foreign objects mixed in hydraulic oil.

The closed-circuit control valve device 37 thus configured includes sixteen control valves 39A to 39D, 40A to 40D, 41A to 41D, 42A to 42D mounted on the first mounting surface 38C of the manifold 38, and sixteen other control valves 43 mounted on the second mounting surface 38D. This configuration advantageously allows the closed-circuit control valve device 37 to have increased installation intervals for the control valves 39A to 39D, 40A to 40D, 41A to 41D, 42A to 42D, 43, and their uniform weight distribution in the front-rear direction.

The open-circuit control valve device 45 is located forward of the engine 19 and provided on the revolving frame 8. Specifically, the open-circuit control valve device 45 is transversely disposed to extend in the right-and-left direction so as to be closer to the right side of the revolving frame 8 (adjacent to the right side of the closed-circuit control valve device 37). The open-circuit control valve device 45 includes a later-described manifold 46, a control valve 47, other control valve 48, and a filter 49, as in the closed-circuit control valve device 37.

The manifold 46 is flat in the front-rear direction and formed as a rectangular block (block-shaped structure) extending in the right-and-left direction and in the vertical direction, as in the manifold 38. The manifold 46 has a lower portion (not shown), an upper surface 46A, a first mounting surface 46B, and a second mounting surface 46C, with the lower portion detachably mounted on the revolving frame 8 with bolts (not shown). The filter 49 is mounted on the upper surface 46A.

Herein, the manifold 46 has the first mounting surface 46B on the rear side provided as a mounting surface for the open-circuit control valve 47. For example, a plurality of, for example, sixteen connection openings (not shown) are provided on the first mounting surface 46B to allow hydraulic oil to circulate to and from the open-circuit control valve 47. Further, the manifold 46 includes a plurality of oil passage (each not shown) communicating connection openings and communicating the connection openings and the upper surface 46A appropriately.

The open-circuit control valve 47 mounted on the first mounting surface 46B includes a control valve controlling hydraulic oil circulating between the traveling hydraulic motors 3, 4. The open-circuit control valve 47 is mounted on the first mounting surface 46B with bolts so as to communicate with a connection opening formed on the first mounting surface 46B, for example. Sixteen open-circuit control valves 47 are aligned and disposed in a 4 by 4 matrix at equal intervals in the right-and-left direction and in the vertical direction. Meanwhile, for example, other open-circuit control valves 48 mounted on the second mounting surface 46C are aligned and disposed in a 4 by 4 matrix at equal intervals in the right-and-left direction and in the vertical direction, as in the open-circuit control valve 47.

The open-circuit control valves 47, 48 are each aligned and disposed in a 4 by 4 matrix at equal intervals in the right-and-left direction and in the vertical direction, as in the above-mentioned closed-circuit control valves 39A to 39D, 40A to 40D, 41A to 41D, 42A to 42D, 43. Accordingly, an oil passage of the manifold 46 can readily be formed.

The filter 49 is mounted on the upper surface 46A of the manifold 46. The filter 49 can prevent damage on a sliding portion of a hydraulic actuator or a valve by capturing foreign objects mixed in hydraulic oil, as in the filter 44.

The open-circuit control valve device 45 thus configured includes sixteen control valves 47 mounted on the first mounting surface 46B of the manifold 46 and sixteen other control valves 48 mounted on the second mounting surface 46C, as in the closed-circuit control valve device 37. This configuration advantageously allows the open-circuit control valve device 45 to have increased installation intervals for the control valves 47, 48, and their uniform weight distribution in the front-rear direction.

A hydraulic oil tank 50 is disposed on the revolving frame 8 to reserve hydraulic oil to be supplied to the open-circuit hydraulic pump 35 and the like. The controller 51 is connected to the operating device 11, the control valves 39A to 39D, 40A to 40D, 41A to 41D, 42A to 42D, 43 of the closed-circuit control valve device 37 and the control valves 47, 48 of the open-circuit control valve device 45 via signal lines. The controller 51 switches between the control valves 39A to 39D, 40A to 40D, 41A to 41D, 42A to 42D, 43 and the control valves 47, 48 of the open-circuit control valve device 45 based upon a signal from the operating device 11.

The hydraulic excavator 1 of this embodiment is configured as described above, and subsequently, the operation of the hydraulic excavator 1 will be explained.

An on-board operator in the cab 9 starts the engine 19 to drive the closed-circuit hydraulic pump 29 and the open-circuit hydraulic pump 35. In this state, the operator can advance or retreat the lower traveling structure 2 by operating the left and right traveling levers 11C, 11D. Meanwhile, the operator can perform excavating work of earth and sand by operating the left working control lever 11A and the right working control lever 11B to rotate the working mechanism 12.

Thus, in this embodiment, the closed-circuit control valve device 37 includes: the manifold 38 mounted on the revolving frame 8, composed of a block having two opposed surfaces defined the rear surface as the first mounting surface 38C and the front surface as the second mounting surface 38D, and including an oil passage formed therein; the plurality of control valves 39A to 39D, 40A to 40D, 41A to 41D, 42A to 42D mounted on the first mounting surface 38C and supplying and discharging hydraulic oil supplied from the closed-circuit hydraulic pump 29 via the oil passage of the manifold 38 to the plurality of actuators; and the plurality of other control valves 43 mounted on the second mounting surface 38D and supplying and discharging the hydraulic oil supplied from the closed-circuit hydraulic pump 29 via the oil passage of the manifold 38 to the plurality of actuators. Additionally, a number of control valves of the plurality of control valves 39A to 39D, 40A to 40D, 41A to 41D, 42A to 42D controlling one hydraulic actuator of the plurality of hydraulic actuators are aligned and disposed in a predetermined direction on the first mounting surface 38C or the second mounting surface 38D.

Conversely, the open-circuit control valve device 45 includes: the manifold 46 located adjacent to the right side of the closed-circuit control valve device 37, mounted on the revolving frame 8, composed of a block having two opposed surfaces defined as the first mounting surface 46B and the second mounting surface 46C, including an oil passage formed therein; the plurality of control valves 47 mounted on the first mounting surface 46B and supplying and discharging hydraulic oil supplied from the open-circuit hydraulic pump 35 via the oil passage of the manifold 46 to the plurality of actuators; and the plurality of other control valves 48 mounted on the second mounting surface 46C and supplying and discharging the hydraulic oil supplied from the open-circuit hydraulic pump 35 via the oil passage of the manifold 46 to the plurality of actuators. Additionally, a number of control valves of the plurality of control valves 43 controlling one hydraulic actuator of the plurality of hydraulic actuators are aligned and disposed in a predetermined direction in an in-plane on the first mounting surface 46B or the second mounting surface 46C.

Therefore, the closed-circuit control valve device 37 can include numerous control valves 39A to 39D, 40A to 40D, 41A to 41D, 42A to 42D, 43 mounted on the first mounting surface 38C as a rear surface of the manifold 38 and the second mounting surface 38D as a front surface in a distributed manner.

Consequently, the closed-circuit control valve device 37 can be downsized even with a smaller-formed manifold 38, which can advantageously include such numerous control valves 39A to 39D, 40A to 40D, 41A to 41D, 42A to 42D, 43 mounted thereon.

Also, the resulting increased intervals of the control valves 39A to 39D, 40A to 40D, 41A to 41D, 42A to 42D, 43 can secure spaces for mounting the control valves 39A to 39D, 40A to 40D, 41A to 41D, 42A to 42D, 43 on the manifold 38, connecting the closed-circuit pipe 30 to the control valves 39A to 39D, 40A to 40D, 41A to 41D, 42A to 42D, 43 and maintaining the control valve device, and the operational efficiency for each operational work can be improved.

Moreover, the closed-circuit control valve device 37 includes the control valves 39A to 39D, 40A to 40D, 41A to 41D, 42A to 42D mounted on the first mounting surface 38C as the rear surface of the manifold 38, and other control valves 43 mounted on the second mounting surface 38D as the front surface. Accordingly, the closed-circuit control valve device 37 can achieve uniform weight distribution of the control valves in the front-rear direction. As a result, the posture of the closed-circuit control valve device 37 can readily be stabilized when an operator lifts up the closed-circuit control valve device 37, resulting in improved operational efficiencies for assembly and replacement. In addition, the resulting stable weight balance on the closed-circuit control valve device 37 can reduce its burdens on the revolving frame 8 when the closed-circuit control valve device 37 is mounted on the revolving frame 8 and reduce other burdens on mounting bolts, thereby improving the durability of these parts. Likewise, the open-circuit control valve device 45 can have the above-mentioned effect.

The plurality of control valves 39A to 39D, 40A to 40D, 41A to 41D, 42A to 42D, 43 each has a spool S movable in the axial direction. In addition, the control valves 39A to 39D, 40A to 40D, 41A to 41D, 42A to 42D mounted on the first mounting surface 38C of the manifold 38 and other control valves 43 mounted on the second mounting surface 38D are disposed so as to allow the spool S to operatively approach or separate from the manifold 38 in a direction (in the direction of arrow A). As a result, the opposed arrangement of the spools S at the closed-circuit control valve device 37 can alleviate impacts of the operating spools S from each other. Likewise, the open-circuit control valve device 45 can have the above-mentioned effect.

The plurality of control valves 39A to 39D, 40A to 40D, 41A to 41D, 42A to 42D mounted on the first mounting surface 38C is aligned and disposed in the right-and-left direction (width direction) and in the vertical direction of the manifold 38, and the plurality of other control valves 43 mounted on the second mounting surface 38D is aligned and disposed in the right-and-left direction (width direction) and in the vertical direction of the manifold 38. As a result, the closed-circuit control valve device 37 allows the control valves 39A to 39D, 40A to 40D, 41A to 41D, 42A to 42D, 43 to readily be attached to and detached from the manifold 38. Likewise, the open-circuit control valve device 45 can have the above-mentioned effect.

The working mechanism 12 includes a boom cylinder 16, an arm cylinder 17, and a bucket cylinder 18, constituting a plurality of hydraulic actuators, and for the plurality of control valves 39A to 39D, 40A to 40D, 41A to 41D, 42A to 42D, the control valves 39A, 39B, 39C, 39D controlling the identical hydraulic actuator are arranged in one row aligned in the right-and-left direction of the manifold 38 and the control valves 39A, 40A, 41A, 42A provided for the closed-circuit hydraulic pump 29 of the identical closed circuit system 25 are arranged in one row aligned in the vertical direction of the manifold 38. The closed-circuit control valve device 37 includes the control valves 39A to 39D, 40A to 40D, 41A to 41D, 42A to 42D, 43 disposed according to the above example arrangement.

Accordingly, as an example processing, an oil passage communicating the control valves 39A, 40A, 41A, 42A can readily be formed only by drilling the manifold 38 downward from the upper surface 38B thereof. In addition, an oil passage communicating the control valves 39A to 39D can readily be formed only by drilling the manifold 38 in the right-and-left direction. Oil passages communicating the control valves 40A to 40D, 41A to 41D, 42A to 42D, and the other control valves 43 can also readily be formed. As a result, the manifold 38 can be downsized and processing costs can be reduced. Likewise, the manifold 46 of the open-circuit control valve device 45 can have the above-mentioned effect of the closed-circuit control valve device 37.

In this embodiment, the case where a plurality of control valves 39A to 39D, 40A to 40D, 41A to 41D, 42A to 42D is aligned and disposed in the right-and-left direction (width direction) and in the vertical direction of the manifold 38 is illustrated. In addition, the case where the control valves 39A, 39B, 39C, 39D controlling an identical hydraulic actuator are arranged in one row aligned in the right-and-left direction of the manifold 38 and the control valves 39A, 40A, 41A, 42A provided for the closed-circuit hydraulic pump 29 of the identical closed circuit system 25 are arranged in one row aligned in the vertical direction of the manifold 38 is illustrated. However, the arrangement of the control valves 39A to 39D, 40A to 40D, 41A to 41D, 42A to 42D is not restricted to the above-mentioned case.

For example, at least one of a plurality of control valves 39A, 39B, 39C, 39D controlling one hydraulic actuator or a plurality of control valves 39A, 40A, 41A, 42A to which hydraulic oil is supplied from one hydraulic pump may be aligned and disposed in a predetermined direction in an in-plane direction on the first mounting surface 38C of the manifold 38. This configuration makes it easier to drill the manifold 38 to form an oil passage therein.

In other words, for example, a number of control valves of the plurality of control valves 39A to 39D, 40A to 40D, 41A to 41D, 42A to 42D controlling one hydraulic actuator of the plurality of hydraulic actuators may be aligned and disposed in a predetermined direction on the first mounting surface 38C or the second mounting surface 38D.

The hydraulic system of the hydraulic excavator 1 includes the closed circuit systems 25 to 28 composed of the closed-circuit hydraulic pump 29 driven by the engine 19 and the plurality of closed-circuit pipes 30 connecting the closed-circuit hydraulic pump 29 to the boom cylinder 16, the arm cylinder 17, the bucket cylinder 18, and the revolving hydraulic motor 7, and the open circuit systems 31 to 34 composed of the open-circuit hydraulic pump 35 driven by the engine 19, and the plurality of open-circuit pipes 36 connecting the open-circuit hydraulic pump 35 to the plurality of closed-circuit pipes 30, and the control valve device is composed of the closed-circuit control valve device 37 connected to the closed circuit systems 25 to 28 and the open-circuit control valve device 45 connected to the open circuit systems 31 to 34. This configuration can downsize both the closed-circuit control valve device 37 and the open-circuit control valve device 45.

In the embodiment, the case where the closed-circuit control valve device 37 includes sixteen control valves 39A to 39D, 40A to 40D, 41A to 41D, 42A to 42D mounted on the first mounting surface 38C of the manifold 38, and sixteen other control valves 43 mounted on the second mounting surface 38D is illustrated. However, the present invention is not limited to that, and two to fifteen, or seventeen or more control valves may be configured to be mounted on the first mounting surface or the second mounting surface of the manifold. The numbers of the control valves mounted on the first mounting surface and the second mounting surface may be different.

In the embodiment, the case where the closed-circuit control valve device 37 and the open-circuit control valve device 45 are provided side by side in the right-and-left direction on the revolving frame 8 is illustrated. However, the present invention is not limited to that, and for example, one common manifold is provided and the control valve of the closed-circuit control valve device and the control valve of the open-circuit control valve device may be configured to be mounted on the common manifold. Alternatively, three or more control valve devices may be configured to be provided.

The embodiments are explained by taking the example where a hydraulic excavator 1 with a backhoe-type working mechanism 12 is illustrated as a construction machine. However, the present invention is not limited to that, and may be widely employed in other types of construction machines such as a hydraulic excavator with a loading shovel-type working mechanism.

DESCRIPTION OF REFERENCE NUMERALS

1: Hydraulic excavator (Construction machine)
2 Lower traveling structure (Vehicle body)
3, 4: Traveling hydraulic motor (Hydraulic actuator)
5: Upper revolving structure (Vehicle body)
6: Revolving device
7: Revolving hydraulic motor (Hydraulic actuator)
8: Revolving frame (Vehicle body frame)
12: Working mechanism
16: Boom cylinder (Hydraulic actuator)
17: Arm cylinder (Hydraulic actuator)
18: Bucket cylinder (Hydraulic actuator)
19: Engine (Prime mover)
25 to 28: Closed circuit system
29: Closed-circuit hydraulic pump
30: Closed-circuit pipe
31 to 34: Open circuit system
35: Open-circuit hydraulic pump
36: Open-circuit pipe
37: Closed-circuit control valve device (Control valve device)
38, 46: Manifold
38C, 46B: First mounting surface
38D, 46C: Second mounting surface
39A to 39D, 40A to 40D, 41A to 41D, 42A to 42D, 47: Control valve
43, 48: Other control valve
45: Open-circuit control valve device (Control valve device)
S: Spool

The invention claimed is:

1. A construction machine, comprising:

a vehicle body frame;

a working mechanism provided on a front side of the vehicle body frame and including a plurality of hydraulic actuators;

a prime mover provided on a rear side of the vehicle body frame;

a hydraulic pump provided on the prime mover; and a control valve device located forward of the prime mover, provided on the vehicle body frame and controlling the plurality of hydraulic actuators, wherein the control valve device comprises:

a manifold mounted on the vehicle body frame, composed of a block having two opposed surfaces defined as a first mounting surface and a second mounting surface, and including an oil passage formed therein; and a plurality of control valves including a plurality of first switching valves mounted on the first mounting surface of the manifold and each having a spool movable in the axial direction, and a plurality of second switching valves different from the first switching valves mounted on the second mounting surface of the manifold and each having a spool that is different from the spool of the first switching valves and movable in the axial direction, wherein the plurality of control valves control the switching between each of the hydraulic pumps and each of the plurality of hydraulic actuators, and so as to supply and discharge hydraulic oil supplied from the hydraulic pump via the oil passage of the manifold to one of the plurality of hydraulic actuators, and wherein a number of control valves of the plurality of control valves controlling identical hydraulic actuator of the plurality of hydraulic actuators are aligned and disposed in an identical direction on the first mounting surface or the second mounting surface.

2. The construction machine according to claim 1, wherein the plurality of first switching valves mounted on the first mounting surface of the manifold and the plurality of second switching valves mounted on the second mounting surface of the manifold are disposed so as to allow the spool to operatively approach or separate from the manifold in a direction, respectively.

3. The construction machine according to claim 1, wherein the plurality of first switching valves mounted on the first mounting surface is aligned and disposed in the width direction and in the vertical direction of the manifold, and the plurality of second switching valves mounted on the second mounting surface is aligned and disposed in the width direction and in the vertical direction of the manifold.

4. The construction machine according to claim 3, wherein the plurality of first switching valves includes first switching valves controlling the identical hydraulic actuator arranged in one row aligned in the width direction of the manifold and first switching valves controlling the identical hydraulic pump arranged in one row aligned in the vertical direction of the manifold.

5. The construction machine according to claim 1, comprising:

a closed circuit system composed of a closed-circuit hydraulic pump driven by the prime mover and a plurality of closed-circuit pipes connecting the closed-circuit hydraulic pump and the hydraulic actuator; and an open circuit system composed of an open-circuit hydraulic pump driven by the prime mover and a plurality of open-circuit pipes connecting the open-circuit hydraulic pump and the plurality of closed-circuit pipes, wherein the control valve device is composed of a closed-circuit control valve device connected to the closed circuit system and an open-circuit control valve device connected to the open circuit system.

* * * * *